UNITED STATES PATENT OFFICE.

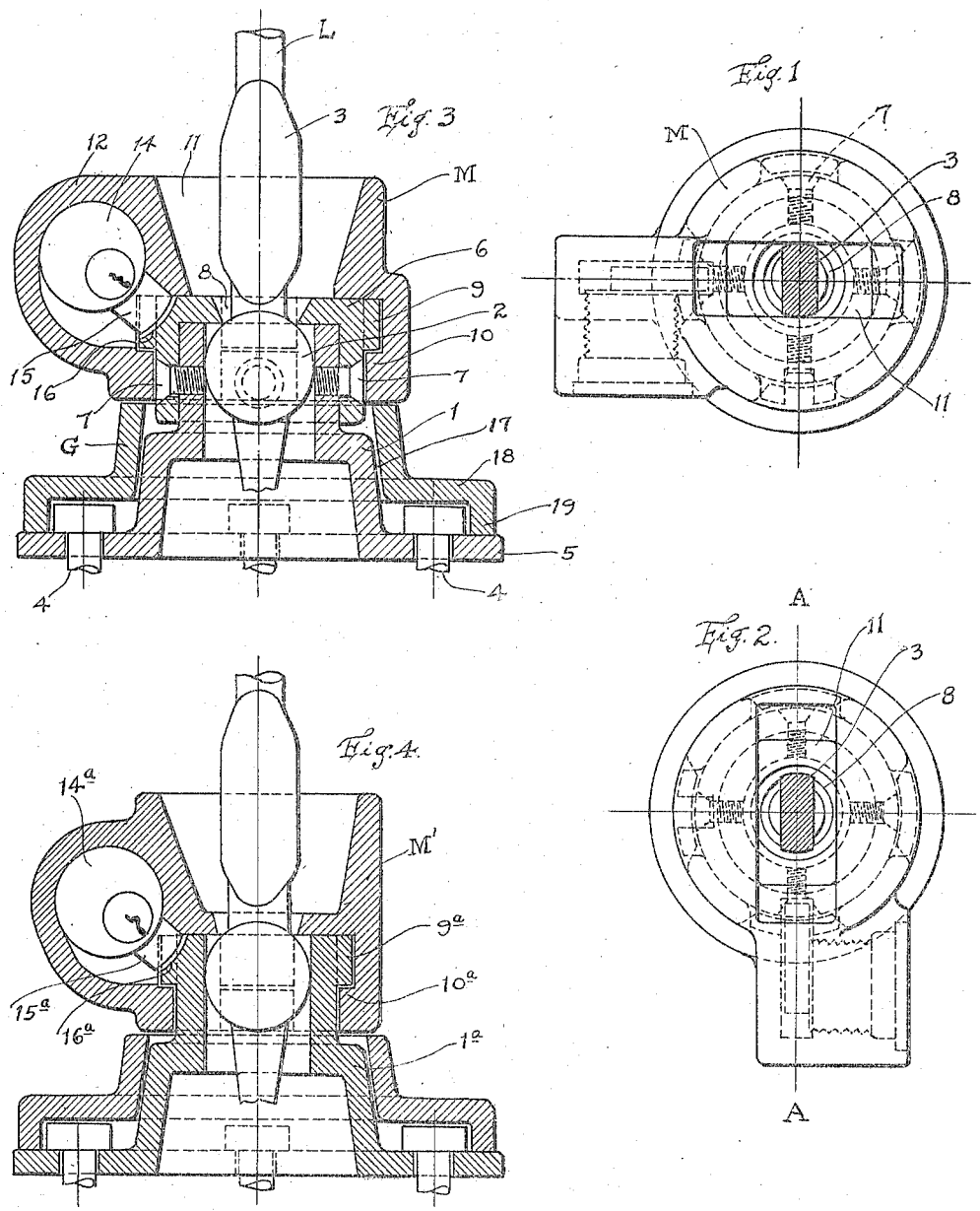

YUSKE MIYASAKI, OF McKEES ROCKS, PENNSYLVANIA.

LOCKING DEVICE FOR LEVERS.

1,345,618.  Specification of Letters Patent.  Patented July 6, 1920.

Application filed September 29, 1919. Serial No. 327,041.

*To all whom it may concern:*

Be it known that I, YUSKE MIYASAKI, a subject of the Emperor of Japan, residing at McKees Rocks, in the county of Allegheny and State of Pennsylvania, have invented certain new and useful Improvements in Locking Devices for Levers, of which the following is a specification, reference being had to the accompanying drawings.

This invention relates to certain improvements in locking devices for levers and has relation more particularly to a device of this general character especially designed and adapted for use in connection with the gear shift lever of a motor-driven vehicle, and wherein said lever is fulcrumed for universal movement within a supporting member or housing, and it is an object of the invention to provide a novel and improved device of this general character whereby the lever may be held in a neutral position to substantially eliminate the possibility of the vehicle being operated by an unauthorized person.

It is also an object of the invention to provide a novel and improved device of this general character comprising a rotatably supported member having coacting therewith lock controlled means for holding said member against movement, and wherein said member is provided with a slot through which the gear shift lever extends, said slot being of a width to hold the lever against movement when the member is in one position and permitting unhindered movement of the lever when the member is in a second position.

Another object of the invention is to provide a novel and improved device of this general character embodying a guard member or sleeve which, when applied, surrounds the supporting member or housing, and is maintained in a position to prevent removal of the bolt screws or the like which are employed for securing the supporting member or housing in working position.

The invention consists in the details of construction and in the combination and arrangement of the several parts of my improved locking device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in plan of a locking device constructed in accordance with an embodiment of my invention, the coacting lever being shown in section, the rotatable member comprised in the device being in a position to hold the lever against movement or in neutral position;

Fig. 2 is a view similar to Fig. 1 with the rotatable member in a second position, and whereby the lever is capable of unhindered movement;

Fig. 3 is a sectional view taken substantially on the line A—A of Fig. 2, and,

Fig. 4 is a view partly in vertical section and partly in elevation illustrating a locking device constructed in accordance with a further embodiment of my invention.

As disclosed in the accompanying drawings, 1 denotes the supporting member or housing, within which is fulcrumed for universal movement the gear shift lever L, and which lever at a point immediately adjacent its fulcrum 2, is rectangular in cross section, as at 3.

The supporting member or housing 1 is maintained in applied position through the medium of the bolts 4 or the like, passing through a flange 5 defining the lower or base end of the member or housing 1.

Fitting upon the upper portion of the member or housing 1 is a cap 6 locked to the member or housing 1 through the instrumentality of the headed screws 7 loosely disposed through the cap 6, and in threaded engagement with the housing or member 1, as is particularly illustrated in Fig. 3. The central portion of the cap 6 is provided with an opening 8 through which extends the lever L and said cap is positioned preferably in close proximity to the lower part of the portion 3 of the lever L.

The peripheral portion of the cap 6 is provided with the outstanding and preferably equi-distantly spaced lugs 9 which operate, in a manner to be hereinafter more particularly referred to, to retain in applied position the member M. The lower portion of the member M surrounds the cap 6, and is provided with the inwardly directed spaced flanges 10 which underlie the flanges 9 whereby the member M is held in working position. The flanges 10 are of a length slightly less than the spaces between the flanges 9, so that the member M can be readily applied into position, and upon slight rotation of said member M the flanges 10 are caused to underlie the flanges 9.

The locking member M has disposed therethrough a slot 11, having its side walls in parallelism and its end walls disposed downwardly on a predetermined incline. The portion 3 of the lever L is arranged within the slot 11, and said slot 11 is of a width approximately equal to the major width of the portion 3 of the lever, so that when the slot 11 is disposed in a direction crosswise of the vehicle, as illustrated in Fig. 1, the side walls of slot 11 will contact with the part 3, particularly when the lever L is in neutral position, and thereby hold said lever against movement.

A portion 12 of the locking member M is enlarged, and has arranged therein a locking mechanism 14 of a desired type and which includes the locking bolt 15, which engages within a recess 16, produced in the peripheral portion of the cap 6.

When it is desired to release the lever L the bolt 15 is moved, preferably through the instrumentality of a key, into inoperative position, and the member M rotated to a point where the slot 11 is in a direction lengthwise of the car, preferably parallel to the longitudinal center of the car. With the member M in this position, with the side walls of the slot 11 substantially parallel with the flat faces of the portion 3 of the lever L, sufficient clearance is provided around the lever L to permit the same to have the requisite movement to properly shift the gears.

With the use of my improved device it will be at once recognized that the possibility of a car being operated by an unauthorized person is substantially eliminated, and further to prevent unauthorized use of the car, as by the unfastening of the support or housing 1, I find it of advantage to employ the guard or sleeve G, which comprises an annular member surrounding the support or housing 1 below the member M, and which annular member 17 is provided at its lower marginal portion with an outstanding annular flange 18 of a width to overlie the bolts 4 or the like. The outer marginal portion of the flange 18 is defined by downwardly directed flange 19, which contacts with the flange 5 of the supporting member or housing 1, at a point outwardly of the bolts 4 or the like. By this means the bolts 4 or the like are completely housed or inclosed, so that the same cannot be tampered with.

The guard G is applied in working position with respect to the supporting member or housing 1 before the locking member M is applied, and this locking member M serves as a medium whereby the guard G is held in working position as the member 17 has its upper edge underlying the member M when the device is applied.

The form of invention illustrated in Fig. 4 is substantially the same as has been described with respect to the disclosure in Figs. 1, 2 and 3 except that the locking member M' serves as a cap for the upper end of the supporting member or housing 1ª and the inwardly directed lugs 10ª of the member M' coacting with the outstanding spaced lugs 9ª carried directly by the upper end portion of the supporting member or housing 1ª.

The upper end portion of the housing 1ª in its periphery is provided with a recess 16ª into which seats the bolt 15ª of the locking mechanism 14ª for holding the member M' against rotation.

From the foregoing description, it is thought to be obvious that a locking device constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a supporting housing and a lever extending therethrough and fulcrumed therein for universal movement, a locking member rotatably supported by the housing and provided with a slot through which the lever extends, the portion of the lever within the slot being provided with opposed flattened faces, said faces being of a width approximately equal to the width of the slot, said slot being of a length in excess of the width of said flattened faces, and means for holding the locking member against rotation when the longitudinal axis of the slot is in a direction crossing the flattened faces of the lever.

2. In combination with a housing, securing means therefor, and a lever extending through the housing and fulcrumed therein for universal movement, a locking member rotatably engaged with the housing and serving, when in one position, to maintain the lever against universal movement and a guard member independent of the locking member surrounding the housing inwardly of the locking member and overlying the securing means for the housing.

3. In combination with a housing and a lever disposed therethrough and fulcrumed therein for universal movement, a locking member surrounding an end portion of the housing and provided with a slot through which the lever extends, said housing being provided with outwardly directed flanges beneath which the flanges of the locking member extend, the length of the flanges of the locking member being less than the distance between adjacent flanges of the housing, and means carried by the locking member and coacting with the housing for holding the locking member against movement around the housing, the width of the slot of the locking member being approximately equal to one dimension of the portion of the lever within the slot, the length of the slot being greater than such dimension.

4. In combination with a housing and a lever disposed therethrough and fulcrumed therein for universal movement, a locking member surrounding an end portion of a housing and provided with a slot through which the lever extends, the width of the slot of the locking member being approximately equal to one dimension of the portion of the lever within the slot, the length of the slot being greater than such dimension, and means for holding the locking member against movement around the housing.

In testimony whereof I hereunto affix my signature.

YUSKE MIYASAKI.